United States Patent [19]

Kobayashi

[11] 4,224,806
[45] Sep. 30, 1980

[54] TRIPOD-TYPE UNIVERSAL JOINT WITH A SNAP-ON RETAINER

[75] Inventor: Katsuyuki Kobayashi, Toyota, Japan

[73] Assignee: Toyota Jidosha Kogyo Kabushiki Kaisha, Toyota, Japan

[21] Appl. No.: 30,745

[22] Filed: Apr. 17, 1979

[30] Foreign Application Priority Data

Oct. 11, 1978 [JP] Japan .................. 53-124943

[51] Int. Cl.³ .............................................. F16D 3/30
[52] U.S. Cl. ..................... 64/21; 308/236; 64/8
[58] Field of Search ............. 64/21, 8, 17 R, 17 A, 64/32 R, 32 F; 308/236, DIG. 11

[56] References Cited

U.S. PATENT DOCUMENTS

| | | | |
|---|---|---|---|
| 2,897,022 | 7/1959 | Marola | 308/DIG. 11 |
| 2,984,997 | 5/1961 | Wight | 64/21 |
| 3,613,396 | 10/1971 | Drevard et al. | 64/21 |
| 3,748,869 | 7/1973 | Orain | 308/236 |
| 4,083,202 | 4/1978 | Westercamp | 64/21 |

*Primary Examiner*—Ira S. Lazarus
*Assistant Examiner*—Magdalen Moy
*Attorney, Agent, or Firm*—Finnegan, Henderson, Farabow, Garrett & Dunner

[57] ABSTRACT

A tripod type universal joint wherein the ball rollers and the needle rollers on which they turn are retained on the trunnions by holding constructions which comprise each: a circlip engaged in a groove on the end of the trunnion; and an annular retainer, which is formed with an inner cylindrical surface which fits snugly over the trunnion, a cutaway with a tapered entrance which guides the circlip into the hole of the retainer and compresses it by a sliding and squeezing action, a circlip stop face which stops the retainer from coming off the trunnion, when the circlip has expanded so as to oppose the stop face, and ball roller and needle roller stop faces which retain the ball roller and the needle rollers on the trunnion.

11 Claims, 10 Drawing Figures

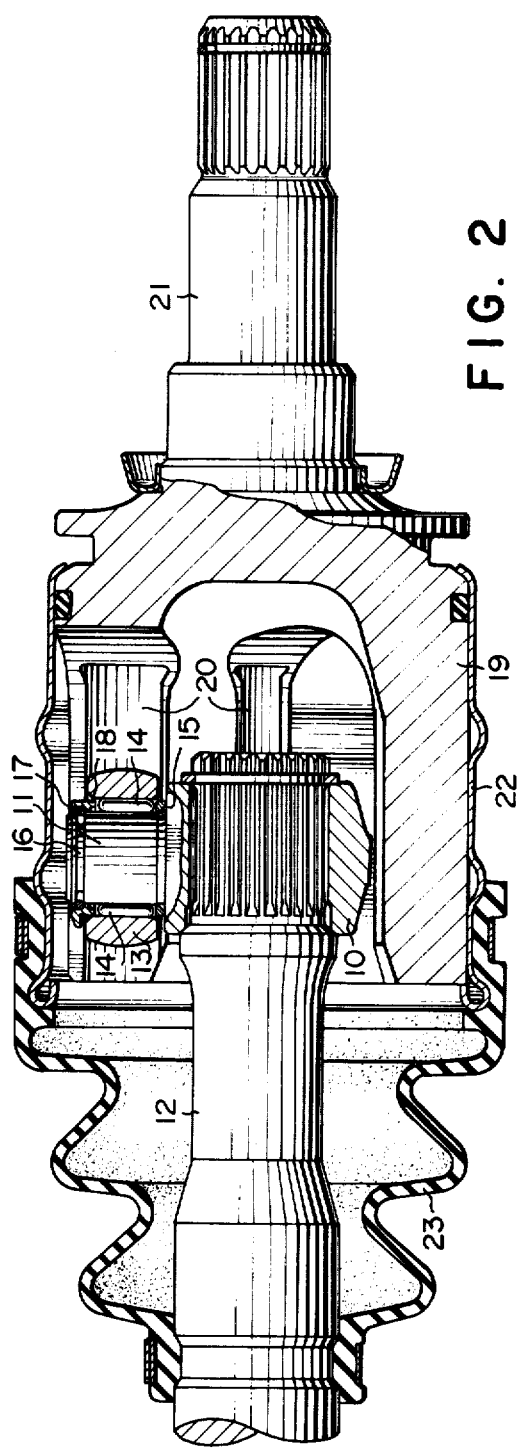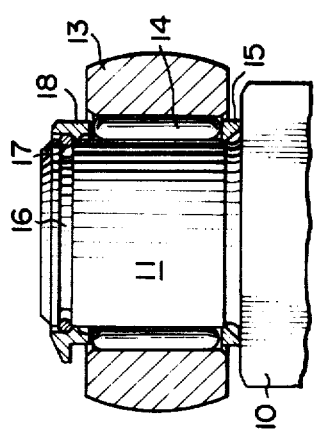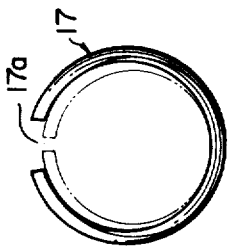

TRIPOD-TYPE UNIVERSAL JOINT WITH A SNAP-ON RETAINER

BACKGROUND OF THE INVENTION

This invention relates to universal joints—in detail, to the field of tripod type universal joints—and particularly provides a novel type of holding construction for holding the ball rollers and the needle rollers of such a tripod-type universal joint.

A tripod-type universal joint is adapted to transmit power from an input shaft to an output shaft. In the tripod-type universal joint, a central hub connected with an input or output shaft has three cylindrical trunnions projecting therefrom in three directions at 120° to one another. Each of these trunnions has mounted on it a ball roller which is movable axially along the axis of the trunnion to a certain extent, and is also able to rotate around the axis of the trunnion. The ball rollers are of a generally part-spherical external shape, and they engage in roller races formed in a barrel-shaped element, which is integrally formed with an input or output shaft. The ball rollers can roll to and fro in these ball races.

Especially in the case of such a tripod-type universal joint which is used as an elongatable, constant velocity universal joint, between the trunnions and the ball rollers are placed needle rollers in order to facilitate the smooth rolling of the ball rollers on the trunnions. In this case, at the end of each of the trunnions is included a holding construction so as to retain the needle rollers and ball rollers on the trunnions. As long as the ball rollers are engaged in their respective roller races, in usual use of the joint there is no likelihood that they should come off their trunnions; but during assembly it can be very difficult to assemble the entire joint without some such holding device to facilitate the work and to prevent damaging the delicate needle rollers. Such a holding device, of course, must not hinder the necessary axial movement of the ball rollers along their trunnions which is required during usual operation of the universal joint. Such axial movement is quite small, however, since this sort of universal joint is not appropriate for transmitting power around sharp angles.

Several kinds of holding construction have been suggested to do this job. None of them, however, has been fully satisfactory.

A first holding construction was proposed one which includes an annular retainer which fits around the outer cylindrical surface of the trunnion. This has a needle roller stop face which opposes the ends of the needle rollers remote from the central hub, and a ball roller stop face which opposes the end of the ball roller remote from the hub. This retainer is held on the end of the trunnion by a circlip which is fitted into a groove formed around the end of the trunnion, and which projects from this groove. In this case, the outer part of the circlip engages a step formed at a middle portion of the inner peripheral face of the retainer (so that the inner radius of the portion of the retainer which is closer to the hub is less than the inner radius of the portion of the retainer which is further from the hub) and prevents it coming off the trunnion. Therefore, to assemble such a holding construction, it is necessary to push the retainer further onto the trunnion than its usual position during operation, in order to be able to fit the circlip into the groove on the trunnion. This requires that the needles are formed correspondingly shorter, thereby increasing the load pressure applied to the needles and the bearing surfaces of the trunnion and of the ball rollers. This presents a danger of damaging the delicate surfaces of the needle rollers, or the inner surface of the ball roller, during operation, and can reduce the working life of the universal joint drastically.

Another type of holding construction is known. In this, the ball roller stop face of the aforesaid retainer is provided as a set of flanges which may be elastically deformed. This permits placing the ball roller onto the trunnion after fitting the retainer to the trunnion by the circlip by elastically deforming the flanges. Of course, there is no problem in fitting the needle rollers after the retainer is fitted, since they can be approached sideways to their positions, in the absence of the ball roller. However, in this case, as all the needle rollers must be attached to the exterior cylindrical surface of the trunnion before fitting the ball roller, it is very troublesome to assemble the joint, and again, while the ball roller is being pushed over the elastically deformed flanges, there is a possibility that its internal annular cylindrical face, or the needle rollers, may be damaged, especially in view of the force required.

Again, there is a type of holding construction similar to the aforesaid one, wherein the flanges are not elastically deformed out of the way of the ball roller, but are bent into position after the ball roller has been fitted. However, this bending introduces weaknesses into the retainer, again risks damaging the various parts, and is generally difficult and unsatisfactory.

SUMMARY OF THE INVENTION

Therefore, it is an object of the present invention to provide a tripod type universal joint with a holding construction to retain the ball rollers and the needle rollers, which is quick and easy to assemble, runs no risk of damaging the parts of the joint, and is cheap.

This object is accomplished according to the present invention by a tripod-type universal joint, comprising a central hub member; a trunnion of cylindrical outer surface shape protruding from the central hub member which has a groove formed around its periphery near its tip portion; a plurality of needle rollers arranged around the outer surface of the trunnion; a ball roller of part-spherical outer shape and with a cylindrical hole through it, which is engaged over the needle rollers so as to rotate on them around the axis of the trunnion; an elastic circlip which is engaged around the trunnion in the groove, which in its unstressed state has an outer periphery approximately circular in shape which is larger in radius than the cylindrical surface of the trunnion and an inner periphery approximately circular shape which is smaller in radius than the cylindrical surface of the trunnion, and which is radially thinner than the groove is deep; and a generally annular retainer, fitted over the tip of the trunnion and the circlip, which is formed with an inner cylindrical surface slightly larger than the cylindrical surface of the trunnion and conforming snugly thereto; an annular needle roller stop face which opposes the ends of the needle rollers which are remote from the central hub; an annular ball roller stop face which opposes the end of the ball roller which is remote from the central hub; a cutaway extending from the needle roller stop face and tapering down to the inner cylindrical surface; and a first circlip stop face which joins the inner cylindrical surface at its edge remote from the central hub, and which opposes the circlip, thereby preventing the retainer from coming off the end of the trunnion away from the central hub; the retainer thereby retaining the needle rollers and the ball roller on the trunnion.

BRIEF DESCRIPTION OF THE DRAWINGS

The present invention will now be described with reference to some preferred embodiments, and with reference to the drawings, which, however, are given for the purposes of illustration only, and therefore are not intended to be limitative of the present invention. In these drawings:

FIG. 1 is a partly sectional view of a tripod-type universal joint of the present invention;

FIG. 2 is an enlarged sectional view of one of the ball rollers of the assembled tripod-type universal joint of FIG. 1, showing the needle rollers, the trunnion, and a section of the annular retainer;

FIG. 3 is a plan view of the circlip used in the present invention;

FIGS. 9 and 10 are figures similar to FIGS. 5 and 6, showing the retainer ring of a second embodiment of the tripod type universal joint of the present invention, wherein FIG. 10 is an enlarged view of the part of FIG. 9 which is surrounded by a circle "B."

DESCRIPTION OF THE PREFERRED EMBODIMENTS

Figure 4:
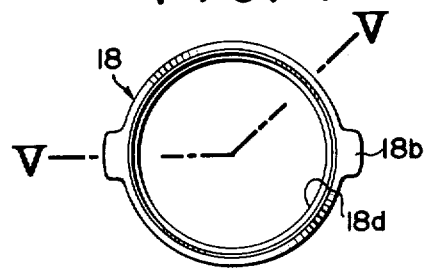
FIG. 4 is a plan view of the annular retainer ring used in the present invention.

FIG. 1 is a partly cut away view, showing a first embodiment of the tripod-type universal joint of the present invention. This universal joint has a central hub 10, and from this central hub 10 project radially outwards three trunnions 11, which are equally spaced at angles of 120° around the central axis, and are of a cylindrical external shape. This central hub 10 also is joined, via splines, to a first movement shaft 12.

Each of said trunnions 11—only one of them is shown in the figure, because the other two do not fall in the plane of the drawing—carries and supports a ball roller 13, which has an external shape which is part of the surface of a sphere, and which has a cylindrical hole bored through it. In the space between the ball roller 13 and the trunnion 11 are disposed a plurality of needle rollers 14, in a conventional manner, so that the ball roller 13 can rotate about them around the axis of the cylindrical trunnion 11. The ball roller 13 is also free to move axially along the axis of the trunnion 11, to a certain extent, by sliding over the needle rollers 14. However, the axial movement of the needle rollers 14, and the axial movement of the ball roller 13, is restricted by a holding construction according to the present invention, which is formed of two elements: an elastic circlip 17 which is engaged in an annular groove 16 formed around the periphery of the tip of the trunnion 11, and an annular retainer 18, fitted over the tip of the trunnion 11 and the circlip 17, of a particular construction which will be explained hereinafter.

A spacer 15 is mounted around the periphery of said trunnion 11, at its root portion where it joins the central hub 10, so as to stop the needle rollers 14 moving too near to the central hub 10.

Each of these three ball rollers 13 engages between two roller races 20 which are formed in the outer barrel-shaped element 19. Thus six of these roller races 20 are formed in the barrel-shaped element 19, two of them engaging each ball roller 13. In FIG. 1, only two of these six roller races 20 are visible. The ball rollers 13 can roll to and fro in these roller races 20, from left to right as seen in FIG. 1. These roller races 20 extend parallel to the central axis of the barrel-shaped element 19, and, if that element were to be seen in section perpendicular to its central axis, each of the roller races 20 would have a part-circular sectional form.

At the end part of said barrel-shaped element 19 is integrally formed a second movement shaft 21. Attached over the outside of the barrel-shaped element 19 is a cylindrical cover 22, and further between said cylindrical cover 22 and said first movement shaft 12 is fixed a concertina-like boot 23, which is formed of flexible material such as rubber.

Now, the particular structure of the retaining construction of the universal joint of the present invention will be explained, with particular reference to FIGS. 2-8.

The circlip 17 is shown in FIG. 3 in plan view, and may be seen in section in FIG. 2. It has a circular cross-section, and in plan view it is of a generally circular form, with a cutaway 17a. In its unstressed condition, its outer shape has a larger radius than does the cylindrical surface of the trunnion 11, and its inner shape has a smaller radius. Thus the radius of the said outer shape of the circlip 17 is essentially larger than the radius of the inner cylindrical surface 18d of the retainer 18, as will be seen hereinafter. The size of the said cutaway 17a of the circlip 17 must be at least such as to permit the circlip 17 to be squeezed until its outer size is equal to the size of the outer cylindrical surface of the trunnion 11, without the ends of the circlip fouling one another.

Figure 8:
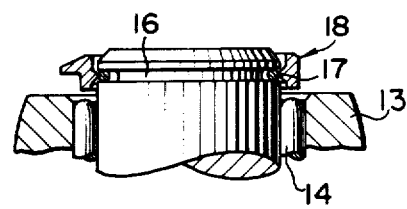

However, it is to be noted that the cross-section of the circlip need not necessarily be circular. It could be elliptical or rectangular without departing from the principles of the present invention. What is essential is that, when the circlip 17 is engaged into the groove 16 formed around the tip of the trunnion 11, and when the circlip 17 is compressed so that its outer shape is flush with the outer cylindrical shape of the trunnion 11 and is of the same radius as the trunnion 11, the groove should be able to accomodate it without fouling. For example, in the embodiment shown in FIG. 2, the circlip has a circular cross-section, and the groove has a U-shaped or ditch-shaped cross-section, and, as shown in FIG. 8, the outer periphery of the bottom of the groove is smaller than the inner periphery of the circlip 17, when the circlip 17 is compressed so that its outer periphery is the same size as the outer cylindrical surface of the trunnion. Therefore, between the circlip 17 and the bottom of the groove 16, a clearance always remains.

Figure 5:
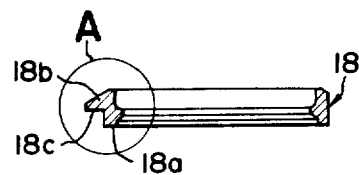
FIG. 5 is a section of FIG. 4 along the lines V—V.
Figure 6:
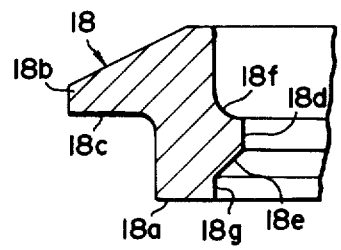
FIG. 6 is an enlarged view of the part of FIG. 5 which is surrounded by a circle "A;"

The form of the annular retainer 18 is well shown in FIGS. 4-6. The retainer 18 has a generally ring-like form, as can be seen in FIG. 4, and it has flanges 18b formed which project radially outwards. In the illustrated embodiment, these flanges are two in number, but this is not essential; there could be more than two, or indeed there could be provided a continuous flange all around the periphery of the retainer. As can be seen from the cross-section of the annular retainer 18 shown in FIG. 6, the face of the retainer 18 nearest to the central hub 10 is formed as a flat face 18a, which is adapted to oppose the needle rollers 14. In the shown embodiment, this flat face 18a is stepped away from the face 18c of the flanges 18b, but this is not essential for the present invention. The flanges 18b are adapted to oppose the ball roller 13.

The inner surface of the retainer 18 is cylindrical, and is denoted in the figures by 18d. It is just slightly bigger than the outside surface of the trunnion 13, so that when fitted over the trunnion it conforms snugly thereto. Extending from the needle roller stop face 18a to the inner cylindrical surface 18d is a cutaway portion, the surface of which is designated in FIG. 6 by 18e and 18g. The surface 18g, which is contiguous to the needle roller stop face 18a, is cylindrical; and the surface 18e is conical, tapering down from its lower edge as seen in the figure to its upper edge where it is contiguous with the inner cylindrical surface 18d. The angle of this taper is not critical, as it depends upon the degree of surface roughness of the retainer 18 vis-a-vis the circlip 17. What is important is that when the retainer 18 is pressed over the trunnion 11 it should, via the tapered surface 18e, compress the circlip 17 by a sort of sliding and squeezing action. The angle of this taper may conveniently be 30°–45°.

In other embodiments, this cutaway might be shaped differently; for instance, it might be a simple cone. What is essential is that it should taper down to the surface 18d, so as to perform the above-described squeezing action.

It is desirable, but not essential, that the opening of this cutaway, which in the shown embodiment is the cylindrical surface 18g, should be large enough to accomodate the unrestricted commencement of entry of the circlip 17 in its free, or unstressed, condition. This will materially aid in assembly of the universal joint, by making it unnecessary to squeeze the circlip 17 by hand at any time, and by thus forming the cutaway so that it performs the squeezing of the circlip 17 entirely automatically.

At the end of the inner cylindrical surface 18d remote from the tapering cutaway, i.e. the upper end in the figure, a first circlip stop face 18f joins this inner cylindrical surface, and this opens up away from the axis of the retainer, opposing the circlip 17. In the shown embodiment, this first circlip stop face 18f is perpendicular to the inner cylindrical surface 18d where it meets it, but this is not essential, provided that the angle of this stop face 18f where it meets the circlip 17 is generally rather shallow, so that no sliding and squeezing action analogous to the action of the conical portion 18e in the shown embodiment occurs. The opposition of this first circlip stop face 18f and the circlip 17, of course, stops the retainer 18 from coming off the trunnion 11 and the circlip 17, when it has been fitted thereto. Thus the retainer 18, by its annular needle roller stop face 18a and annular ball roller stop face, retains the needle rollers 14 and the ball roller 13 on the trunnion 11.

Now the process of assembly of the universal joint according to the present invention will be explained. First the spacer 15 is put over the root of the trunnion 11, and then the ball roller 13 is engaged over the outer cylindrical surface of the trunnion 11, with of course some play being left therebetween. Next, the circlip 17 is engaged into the groove 16 over the tip of the trunnion 11, while it is enlarged in radius, perhaps by pulling by a conventional tool or the like. As shown in the figures, to aid this operation, the tip of the trunnion 11 may advantageously be slightly tapered off. In this case, the circlip 17 may be simply pushed down onto the trunnion 11, and its radius is then enlarged automatically by a kind of sliding and stretching action performed by the slope of the taper.

Figure 7:
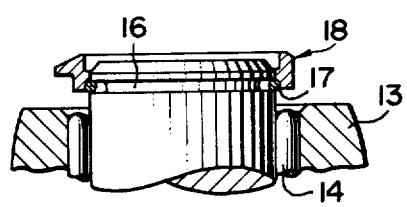
FIGS. 7 and 8 are views similar to FIG. 2, showing the holding construction of the tripod type joint of FIG. 1 during various stages of its assembly process for the purposes of explanation.

When the said circlip 17 has been engaged into the said groove 16, it returns to the free or unstressed condition. Thus, because its inner approximately circular shape is smaller in radius than the cylindrical surface of the trunnion 11, it is retained by the groove 16, and is substantially axially fixed with respect thereto. Thus the needles 14 are mounted into the annular space left between the trunnion 11 and the ball roller 13. Next, the annular retainer 18 is approached to and offered up to the end of the trunnion 11, its side which comprises the cylindrical surface 18g being presented. As shown in FIG. 7, the circlip 17 enters the cutaway at its opening part. As mentioned above, it is desirable, as a preferred embodiment, that the opening of the cutaway should be larger than the outside shape of the circlip 17 in its free or unstressed condition, for this entry to be unrestricted; but, if in fact this opening is slightly smaller, it may be necessary to somewhat constrict the circlip 17, in order to make it enter the cutaway. Meanwhile, the inner cylindrical surface 18d of the retainer 18 fits snugly over and slides over the trunnion 11. As the retainer 18 is pushed onto the trunnion 11, the circlip 17 comes into contact with the tapered surface 18e of the cutaway, and is pushed against it. By the taper, this surface 18e acts to compress the circlip 17 automatically, in a kind of sliding and squeezing action. As the circlip 17 is squeezed, it allows the retainer 18 to move further onto the trunnion 11. In the end the circlip 17 is squeezed so much that its outer shape is flush with the outer cylindrical surface of the trunnion 11. This is possible, because, as stated above, the radial thickness of the circlip 17 is less than the depth of the groove 16. Thus it is possible for the entire circlip 17 to lie in the groove 16 without any part of it protruding therefrom. When this has happened, the retainer 17 can slide freely over the trunnion 11, and it does so, thus passing the inner cylindrical surface 18d of the retainer over the groove 16 with the compressed circlip 17 lying therein. This condition is shown in FIG. 8.

When, however, the retainer 18 has been pushed a certain distance over the trunnion 11, the compressed circlip 17 is able to expand on the other side of the inner cylindrical surface 18d and opens up past the first circlip stop face 18f. Since, as stated above, this first circlip stop face 18f makes a rather shallow angle where it meets the circlip 17, no reverse action can occur, similar to the action of the circlip 17 against the conical taper 18e, to compress the circlip 17 when the retainer 18 is pulled in an upwards direction in the figures so as to be removed from the trunnion 11. Therefore, the opposition of the circlip 17 against the first circlip stop face 18f prevents the retainer 18 from coming off the end of the trunnion 11 away from the central hub 10. This condition is shown in FIG. 2. Thus, since the retainer 18 has the needle roller stop face 18a and the ball roller stop face 18b, the needle rollers and the ball roller are also prevented from coming off the trunnion 11. However, it is to be noted that all play is not prohibited to the needle rollers 14 and the ball roller 13; in fact, all of these can move to and fro a certain amount in the axial direction along the trunnion 11.

Figure 9:
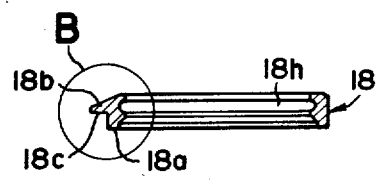
Figure 10:
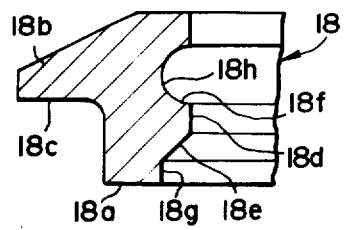

FIGS. 9 and 10 show a second embodiment of the universal joint according to the present invention. In these figures, corresponding numbers to those in the other figures designate parts which correspond to the parts of the first embodiment. In this joint, the retainer 18 is essentially the same as in the embodiment illustrated, except that a second circlip stop face is provided, which opposes the circlip 17 on its opposite side from the first circlip stop face 18f, thereby preventing the retainer from moving further towards the central hub 10 than a central position. In fact, in this embodiment, the circlip 17 is sandwiched in between the first and the second circlip stop faces, and thereby the retainer 18 is substantially axially fixed with respect to the trunnion 11. It might be said that in this embodiment the two circlip stop faces combine to form an annular concave groove, 18h. This restraining of movement of the retainer 18 towards the central hub 10 is very important in some designs, since it protects the needle rollers 14 during possible careless assembly.

In both of the embodiments shown, there is provided a part of the inner surface of the retainer, not designated by any particular reference number, which continues on away from the first circlip stop face 18f, and which radially opposes the circlip 17. In the second embodiment, this joins up to the second circlip stop face; in the first embodiment, it is cylindrical. Now, when the circlip 17 has expanded from its compressed state in which it is compressed by the inner cylindrical surface 18d, it is desirable that it should be held snug, without rattling. Therefore, it is desirable that this above-mentioned part of the inner surface of the retainer 18 should be smaller in radius than the circlip 17 in its free or unstressed condition, so that it compresses the circlip 17 slightly and prevents undue play thereof. Then the part may be called a circlip holding face. This particular concept is not directly illustrated in any of the figures, but is easily apprehended therefrom.

Although the present invention has been shown and described with reference to some preferred embodiments thereof, it should be understood that various modifications and omissions of the form and the content thereof may be made by those skilled in the art, without departing from the scope of the invention. For this reason, it is desired that the extent of monopoly protection afforded by Letters Patent should be defined not by any details of the embodiments given, or of the purely illustrative drawings, but solely by the appended claims, which, however, should be interpreted in the light of the preceding specification.

I claim:

1. A tripod-type universal joint, comprising:
 a central hub member;
 a trunnion of cylindrical outer surface shape protruding from the central hub member which has a groove formed around its periphery near its tip portion;
 a plurality of needle rollers arranged around the outer surface of the trunnion;
 a ball roller of part-spherical outer shape and with a cylindrical hole through it, which is engaged over the needle rollers so as to rotate on them around the axis of the trunnion;
 an elastic circlip which is engaged around the trunnion in the said groove, which in its unstressed state has an outer approximately circular shape which is larger in radius than the cylindrical surface of the trunnion and an inner approximately circular shape which is smaller in radius than the cylindrical surface of the trunnion, and which is radially thinner than the groove is deep;
 and a generally annular retainer, fitted over the tip of the trunnion and the circlip, which is formed with:
  an inner cylindrical surface slightly larger than the cylindrical surface of the trunnion and conforming snugly thereto;
  an annular needle roller stop face which opposes the ends of the needle rollers which are remote from the central hub;
  an annular ball roller stop face which opposes the end of the ball roller which is remote from the central hub;
  a cutaway extending from the needle roller stop face and tapering down to the inner cylindrical surface;
  and a first circlip stop face which joins the inner cylindrical surface at its edge remote from the central hub, and which opposes the circlip, thereby preventing the retainer from coming off the end of the trunnion away from the central hub;
 the retainer thereby retaining the needle rollers and the ball roller on the trunnion.

2. The joint of claim 1, wherein the circlip has a generally circular cross-section.

3. The joint of claim 1, wherein the circlip stop face is perpendicular to the inner cylindrical surface at the place where they meet.

4. The joint of claim 1, wherein the needle roller stop face is stepped away axially of the retainer from the ball roller stop face so as to be nearer to the central hub.

5. The joint of claim 1, wherein further the retainer is formed with a second circlip stop face which opposes the circlip on its opposite side from the first circlip stop face, thereby preventing the retainer from moving further towards the central hub than a certain position.

6. The joint of any preceding claim, wherein the opening of the cutaway, where it borders on the needle roller stop face, is large enough to allow unrestricted commencement of entry of the circlip in its unstressed condition.

7. The joint of claim 6, wherein further the retainer is formed with a circlip holding face which joins on to the first circlip stop face and is of generally smaller size than is the circlip in its unstressed condition, and against which the circlip expands under the force of its elasticity so as to be held thereby in stressed condition.

8. The joint of claim 7 wherein the first circlip stop face, the circlip holding face, and the second circlip stop face are combined as an annular concave groove.

9. The joint of claim 6, wherein the cutaway is formed as having a first leading-in portion which is cylindrical, and a second conical portion which tapers down from the first portion to the inner cylindrical surface.

10. The joint of claim 1, wherein the cutaway is formed as having a first leading-in portion which is cylindrical, and a second conical portion which tapers down from the first portion to the inner cylindrical surface.

11. The joint of claim 5, wherein the first circlip stop face, the circlip holding face, and the second circlip stop face are combined as an annular concave groove.

* * * * *